(12) United States Patent
Babbitt, III

(10) Patent No.: US 6,494,065 B2
(45) Date of Patent: Dec. 17, 2002

(54) VALVE LOCKOUT/TAG OUT SYSTEM

(75) Inventor: Edwin V. Babbitt, III, Marion, MA (US)

(73) Assignee: Babbitt Steam Specialty Company, New Bedford, MA (US)

( * ) Notice: Subject to any disclaimer, the term of this patent is extended or adjusted under 35 U.S.C. 154(b) by 0 days.

(21) Appl. No.: 09/964,283

(22) Filed: Sep. 26, 2001

(65) Prior Publication Data

US 2002/0050155 A1 May 2, 2002

Related U.S. Application Data

(60) Provisional application No. 60/235,490, filed on Sep. 26, 2000.

(51) Int. Cl.[7] ............................................... F16K 35/10
(52) U.S. Cl. ............................. 70/177; 70/177; 70/180; 70/21; 137/385; 251/294
(58) Field of Search ...................... 70/175–180, 202, 70/203, 211, 212; 137/385, 383; 251/294

(56) References Cited

U.S. PATENT DOCUMENTS

| | | | |
|---|---|---|---|
| 211,400 A | * | 1/1879 | Harlin et al. |
| 307,101 A | * | 10/1884 | Cole |
| 599,095 A | | 2/1898 | Chambers et al. |
| 844,315 A | | 2/1907 | Bates |
| 938,613 A | * | 11/1909 | Sieben |
| 1,025,011 A | | 4/1912 | Nold |
| 1,026,039 A | | 5/1912 | Humphrey |
| 1,095,295 A | | 5/1914 | Stevens |
| 1,131,821 A | * | 3/1915 | Campbell |
| 1,197,020 A | * | 9/1916 | Farrar |
| 1,286,937 A | | 12/1918 | Carewell |
| 1,300,685 A | | 4/1919 | Woodcock |
| 1,360,944 A | * | 11/1920 | Harkins et al. |
| 1,636,427 A | | 7/1927 | Morrison |
| 3,391,554 A | * | 7/1968 | Wrenshall |
| 3,667,259 A | * | 6/1972 | Reque et al. ................... 70/14 |
| 5,590,682 A | * | 1/1997 | Fischer ....................... 137/382 |
| 6,123,098 A | * | 9/2000 | Gremillion, III ............ 137/382 |
| 6,164,318 A | * | 12/2000 | Dixon ......................... 137/385 |
| 6,205,826 B1 | | 3/2001 | Neeley ......................... 70/175 |
| 6,209,365 B1 | | 4/2001 | Neeley ......................... 70/175 |

* cited by examiner

Primary Examiner—Lloyd A. Gall
(74) Attorney, Agent, or Firm—Nixon Peabody LLP

(57) ABSTRACT

A system for locking a chain-operated valve to prevent unauthorized and inadvertent operation of the valve. The system includes an elongated tube for receiving both lengths of a chain encircling the valve and a locking arrangement positioned at one end of the tube. Both lengths of the chain extending from the valve enter one end of the tube and exit the opposite end of the tube adjacent the lock arrangement. The lock arrangement includes a bracket secured to the tube and extending outwardly from the tube. The bracket preferably includes apertures for receiving a lockout hasp extending through the chain links and the bracket. A conventional padlock or other security locking device may then extend through the hasp to prevent opening of the hasp.

20 Claims, 2 Drawing Sheets

VALVE LOCKOUT/TAG OUT SYSTEM

This application claims the benefit of Provisional Application No. 60/235,490 filed Sep. 26, 2000.

BACKGROUND OF THE INVENTION

1. Field of the Invention

The present invention relates to a system for locking a chain-operated valve to prevent unauthorized and inadvertent operation of the valve, and more particularly, to a system for locking out and tagging out a valve.

2. Description of the Related Art

It is well known to operate a valve with an operating chain to open and or close the valve. An example of a typical chain operated valve is disclosed in U.S. Pat. No. 1,095,295 to Stevens. However, no means for preventing an operator from inadvertently opening or closing the valve by pulling the chain is provided.

Moreover, with conventional lockout systems, the locking means is positioned on or adjacent the valve. See U.S. Pat. No. 1,636,427 to Morrison, which does not enable remote access to the locking means if the valve is located in a hard to reach area, i.e., an overhead space.

Although it is known to enable a remotely located valve to be operated from a distanced location, such as the device shown in U.S. Pat. No. 1,025,011, no means for locking the valve at the operating site is disclosed.

SUMMARY OF THE INVENTION

It is an object of the present invention to overcome the limitations of the prior art systems by providing a valve locking system which can be used with valves that are not easily accessible, and therefore must be operated by pulling a chain to open or close the valve.

It is another object of the present invention to provide a locking system which enables an operating chain to be removably and securely fastened and at the same time preventing an operator from accessing any useable portion of the operating chain.

Still another object of the present invention is to permit a simple tag-out process to be used for the locked valves.

In accomplishing these and other objectives of the invention, there is provided a system for locking a chain-operated valve for preventing unauthorized and inadvertent operation of the valve. An operating chain having opposed ends is attached to the valve. An elongated tube having a first end receives both ends of the operating chain. A locking arrangement is positioned at a second end of the elongated tube to lock the operating chain to the second end of the tube and prevent operation of the valve.

Other features and advantages of the present invention will become apparant from the following description of the invention which refers to the accompanying drawings.

DETAILED DESCRIPTION OF THE PREFERRED EMBODIMENT

Figure 1:
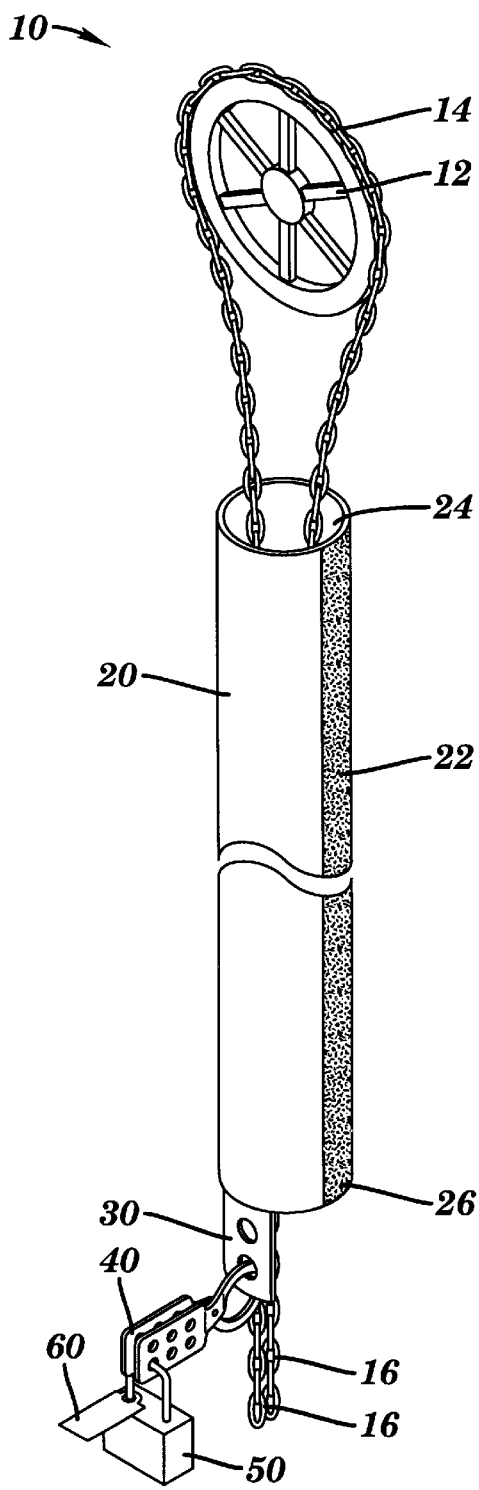
FIG. 1 is a perspective view of the valve locking system of the present invention.

Referring to FIG. 1, a system 10 for locking a chain-operated valve is shown. As is illustrated the valve includes a chain wheel 12 for opening or closing the valve. Although a chain wheel is illustrated, other valve operating mechanisms, such as a handle, can be used with the system of the present invention. An operating chain 14 encircles the valve operating mechanism to permit operation by pulling the chain to rotate the valve in the appropriate direction for opening or closing.

Figure 2:
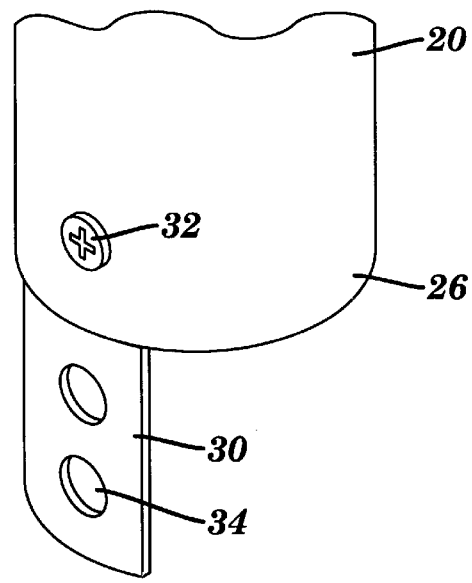
FIG. 2 is an enlarged view of the end of the tube and bracket attached thereto.

Chain 14 opposed ends 16, as shown in FIGS. 1 and 2. Both ends 16 of the chain enter a first end 24 of an elongated tube 20 and exit the opposite, second end 26 of tube 20. Located at end 26 of tube 20 is a locking arrangement which includes a bracket 30, lockout hasp 40, and locking device 50, as described further herein. Tube 20 is located at a location remote from the valve so that the system can be used with valves which cannot be easily accessed, for example, valves located in an overhead space. Tube 20 also includes a reflective tape or marking 22 as a safety precaution.

Referring to FIG. 2 bracket 30 is attached to and extends from end 26 of tube 20. Bracket 30 is securely attached to tube 20 via a fastener 32. Bracket 30 includes a plurality of apertures 34 for receiving a portion of the hasp, which will be described further herein.

Figure 3:
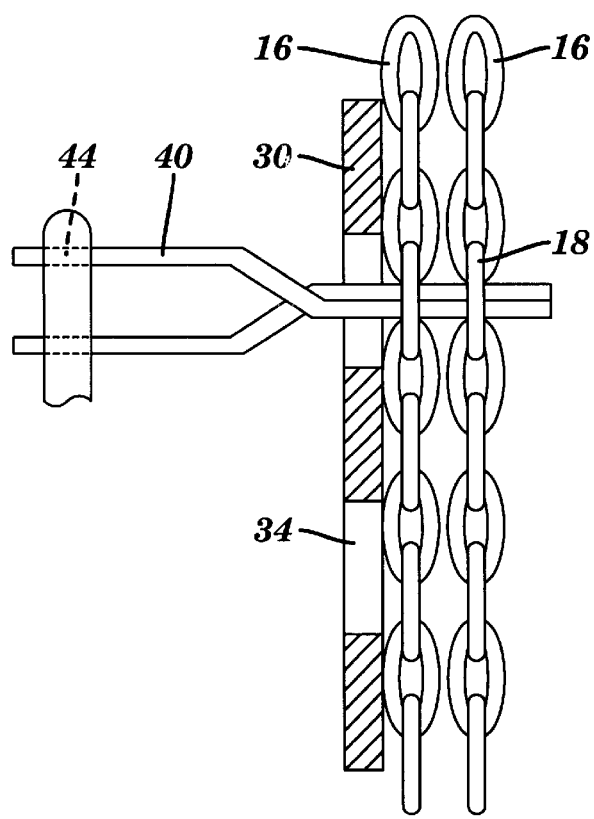
FIG. 3 is a cross-sectional view of the bracket and chain ends attached via the hasp according to the present invention.
Figure 4:
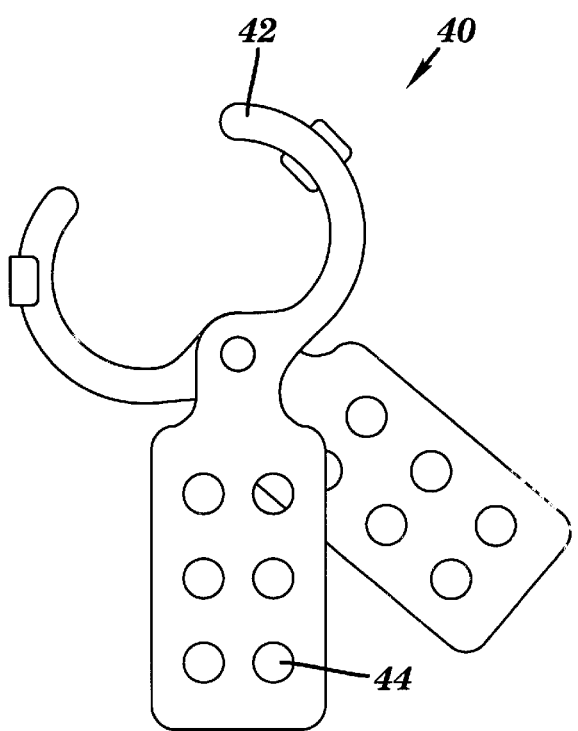
FIG. 4 is a perspective view of a hasp used to connect the chain ends to the bracket according to the present invention.

As shown in FIG. 3, lockout hasp 40 extends through at least one of the apertures 34 and through links 18 of both ends 16 of the chain. An example of lockout hasp 40 is illustrated in FIG. 4. Hasp 40 includes securing portions 42 which are pivotal to open and close to engage or disenagage from bracket 30 and chain 14. Other hasp designs can be substituted and as such the present invention should not be limited to the hasp illustrated. Hasp 40 also includes openings 44 for receiving a locking device 50, such as a padlock or other security device. When assembled and lock 50 closed, chain 14 is secured against movement.

Referring again to FIG. 1, tube 20 has a length that is sufficient to enclose substantially the entire accessible or useable length of chain 14. As a result, intentional or inadvertent operation of the valve by pulling the chain is paratically impossible since the chain cannot be grasped by an operator. Moveover, the locking arrangement of bracket 30, hasp 40 and lock 50 prevent movement of tube 20 with respect to chain 14. Also, the system acts a safety device by preventing accidental entaglement of the chain with personnel and/or equipment.

A tag-out device 60 is attached to lock 50 for recording information and notifying the operator that the valve is locked out in an off or safe position and should not be operated. The tag enables an operator to see who locked out the mechanism and when. Other information can also be shown. Tag 60 is durable and securely fastened to lock 50, so as to not fall off accidentally.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for locking a chain-operated valve for preventing unauthorized and inadvertent operation of the valve, the system comprising:

an operating chain attached to the valve, the chain having opposed ends an elongated tube having a first end for receiving both ends of the operating chain; and a locking arrangement positioned at a second end of the elongated tube for locking the ends of the operating chain to the second end of the tube and preventing operation of the valve.

2. The system of claim 1, wherein the locking arrangement comprises a bracket attached to and extending from the second end of the elongated tube.

3. The system of claim 2, wherein the bracket includes a plurality of apertures and the locking arrangement further comprises a lockout hasp which extends through at least one of the apertures of the bracket and links of the operating chain to secure the chain to the bracket and tube.

4. The system of claim 3, wherein the locking arrangement includes a lock device for securing the lockout hasp to prevent unauthorized opening of the same.

5. The system of claim 1, further comprising a tag-out device fastened to the locking arrangement for recording whether the valve is in a non-operational state.

6. The system of claim 1, wherein the elongated tube and locking arrangement is located remote from the valve and the operating chain includes a useable length sufficient to operate the valve from a remote location.

7. The system of claim 6, wherein the elongated tube has a length sufficient to extend substantially the entire useable length of the operating chain.

8. A system for locking a valve, comprising:

operating means for opening and closing the valve;

a tube having opposed ends for receiving and enclosing the operating means; and a locking arrangement positioned at one end of the tub for locking the operating means thereto to prevent operation of the valve by the operating means wherein the operating means comprises an elongated chain having opposed ends, wherein the tube receives both ends of the chain and the ends of the chain extend through an entire length of the tube to exit from the one end of the tube adjacent the locking arrangement.

9. The system of claim 8, wherein the locking arrangement comprises a bracket attached to and extending from the one end of the elongated tube.

10. The system of claim 9, wherein the bracket includes a plurality of apertures and the locking arrangement further comprises a lockout hasp which extends through at least one of the apertures of the bracket and links of the chain to secure the chain to the bracket and tube.

11. The system of claim 10, wherein the locking arrangement includes a lock device for securing the lockout hasp to prevent unauthorized opening of the same.

12. The system of claim 8, further comprising a tag-out device fastened to the locking arrangement for recording whether the valve is in a non-operational state.

13. The system of claim 9, wherein the elongated tube and locking arrangement is located remote from the valve and the operating chain includes a useable length sufficient to operate the valve from a remote location.

14. The system of claim 13, wherein the elongated tube has a length sufficient to extend substantially the entire useable length of the operating chain.

15. A system for locking a chain operated valve to prevent unauthorized and inadvertent operation of the valve, comprising:

an operating chain attached to the valve, the chain having opposed ends;

an elongated tube having first and second ends, wherein the first end of the tube receives both ends of the chain and both ends of the chain extend from the second end of the tube; and a locking arrangement positioned at the second end of the tube for locking both ends of the chain to the tube to prevent opening or closing of the valve, the locking arrangement including a bracket affixed to the second end of the tube , a lockout hasp which extends through at least one of the apertures of the bracket and links of the chain, and a locking device for extending through the hasp to prevent opening thereof.

16. The system of claim 15, wherein the elongated tube and locking arrangement is located remote from the valve and the chain includes a useable length sufficient to operate the valve from a remote location.

17. The system of claim 16, wherein the elongated tube has a length sufficient to extend substantially the entire useable length of the operating chain.

18. The system of claim 15, further comprising a tag-out device fastened to the locking arrangement for recording whether the valve is in a non-operational state.

19. A method for preventing unauthorized and inadvertent operation of a valve, comprising the steps of:

attaching an elongated chain to an operating portion of the valve, the elongated chain having opposed ends;

positioning an elongated tube in a location remote from the valve, the tube having a first and second end;

extending both ends of the chain through the tube, wherein the ends of the chain are received through the first end of the tube, travel the entire length of the tube and extend from the second end of the tube;

attaching a bracket to the second end of the tube, the bracket including a plurality of apertures;

inserting a lockout hasp through at least one of the apertures of the bracket and through the links of the chain; and extending a locking device through the hasp to secure the chain against any pulling movement.

20. The method of claim 19, further comprising the step of attaching a tag out device to the locking device for recording information.

* * * * *